United States Patent [19]

Marzola et al.

[11] 4,350,797

[45] Sep. 21, 1982

[54] PROCESS FOR PROMOTING THE ADHESION OF POLYOLEFINS TO METALS, GLASS SHEETS, CEMENT, ASBESTOS OR POLAR POLYMERS

[75] Inventors: Roberto Marzola, Ferrara; Enea Garagnani, Piumazzo; Alessandro Moro, Pernate, all of Italy

[73] Assignee: Montedison S.p.A., Milan, Italy

[21] Appl. No.: 238,463

[22] Filed: Feb. 26, 1981

[30] Foreign Application Priority Data

Feb. 28, 1980 [IT] Italy ............................... 20228 A/80

[51] Int. Cl.$^3$ .................... C08F 255/02; C08F 255/04
[52] U.S. Cl. .............................. 525/293; 156/244.11; 156/244.13; 156/321; 156/322; 156/331.8; 428/36; 428/441; 428/443; 428/461; 428/476.1; 428/483; 428/500; 428/518; 428/520
[58] Field of Search .......................................... 525/293

[56] References Cited

U.S. PATENT DOCUMENTS 3,416,990 12/1968 Robinson, Jr. ......................... 161/93
3,437,550 4/1969 Paul, Jr. ................................. 161/93

Primary Examiner—Stanford M. Levin

[57] ABSTRACT

A process for promoting the adhesion of polyolefins to metals, glass sheets, cement, asbestos or polar polymers (polyamides, polyesters, ethylene-vinyl acetate copolymers, etc.), which consists in modifying the polyolefin by reaction with 0.01%–7% by weight of a compound selected from the group consisting of bis-maleamic acids, bis-fumaramic acids, alkyl esters of said acids in which the alkyl radical has from 1 to 12 carbon atoms, and precursors of said acids or esters, and successively heating at temperature at which the polyolefin is applied to the support to be coated. The main applications concern the lining of pipes or other manufactured metal articles in order to protect them against chemical and atmospheric agents.

13 Claims, No Drawings

PROCESS FOR PROMOTING THE ADHESION OF POLYOLEFINS TO METALS, GLASS SHEETS, CEMENT, ASBESTOS OR POLAR POLYMERS

THE PRIOR ART

It is known that polyolefins do not adhere to supports made from metals, glass sheets, cement, asbestos or polymers of polar nature, and for this reason it is necessary to subject them to a modification of a chemical character in order to be able to use them as coatings for said supports: as an example of modification there may be cited the grafting, onto the polyolefin, of an unsaturated carboxylic acid or a derivative thereof, such as maleic acid, fumaric acid or maleic anhydride (see U.S. Pat. Nos. 3,416,990 and 3,437,550).

THE PRESENT INVENTION

We have now found, and this constitutes the subject of the present invention, that it is possible to make the polyolefins to adhere to metals, glass sheets, cement, asbestos or polymers of a polar nature, by modifying said polyolefins by reaction with 0.01 to 7% by weight of a compound selected from the group consisting of (1) bis-maleamic acids of the general formula

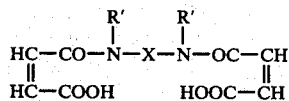

wherein X is the group $(CHR)_n$, in which n is an integer from 2 to 18 and R is hydrogen or an alkyl having from 1 to 6 carbon atoms, or X is a bivalent cycloaliphatic or aromatic group containing one, or more than one, ring or a heterocyclic group; R' is hydrogen or the two R' together being also capable of forming a $(CHR)_n$ group when X is $(CHR)_n$, (2) the corresponding stereoisomer bis-fumaramic acids, (3) alkyl esters of said acids in which the alkyl radical has from 1 to 12 carbon atoms, and (4) the reaction product of a mixture of precursors of said acids or esters.

The precursors are compounds capable of forming by reaction the compounds indicated in (1)–(3).

Typical and preferred bis-maleamic acids are:
N,N'-hexamethylene-bis-maleamic acid;
N,N'-ethylene-bis-maleamic acid;
N,N'-trimethylene-bis-maleamic acid;
N,N'-piperazine-bis-maleamic acid;
N,N'-dodecamethylene-bis-maleamic acid;
N,N'-m-phenylene-bis-maleamic acid;
N,N'-3,3'(trans-stilbene-5,5'-sodiumsulphonate)-bis-maleamic acid;
N,N'-4,4'-(diphenylether)-bis-maleamic acid;
N,N'-4,4'-(diphenylmethane)-bis-maleamic acid;
N,N'-isophoron-bis-maleamic acid (trivial name of the bis-maleamic acid of formula:

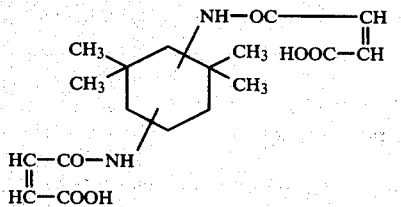

wherein the two nitrogen containing groups of the maleamic acid may substitute a H atom of the ring or of a —CH₃ group); N,N'-2,5-dimethylene-norbornane-bis-maleamic acid.

As examples of precursors of the modifying agent can be cited:

(a) a mixture of maleic anhydride and a diamine;
(b) a mixture of maleic or fumaric acid and a diamine;
(c) a mixture of maleic or fumaric acid and an organic diisocyanate;
(d) a mixture of a monoalkyl ester of maleic or fumaric acid and an organic diisocyanate;
(e) a mixture of maleic or fumaric acid, a monoalkyl ester of maleic or fumaric acid and an organic diisocyanate.

Mixtures (a), (b), (c) give rise to a bis-maleamic or bis-fumaramic acid, while mixtures (d), (e) give rise respectively to a dialkyl ester and a monoalkyl ester of a bis-maleamic or bis-fumaramic acid.

In said precursors the molar ratio acid component/diamine or diisocyanate component is about 2:1.

When using precursors, the total amount of additives ranges also from 0.01 to 7% by weight with respect to the polyolefin.

The modification method consists in heating the polyolefin added with the modifying agent at a temperature generally comprised between 170° C. and the decomposition temperature of the polyolefin itself. In practice, such a temperature corresponds to the temperature at which the polyolefin is applied onto the support to be coated.

It is also possible to use homogeneous mixtures of polyolefins as such with a polyolefin modified also with a high percentage of modifying agent, and which is used as a "masterbatch". To this purpose, there are used polyolefins modified with 0.5%–7% of the modifying agent, said percentage being referred to the weight of the polyolefin.

As polyolefins there may be used high and low density polyethylene, polypropylene, polybutene-1, poly-4-methyl-pentene-1, and in general all the polyolefins of various degrees of crystallinity, and also the essentially amorphous ones. It is also possible to use the plastic ethylene-propylene copolymers containing up to about 20% by weight of polymerized ethylene and obtained by polymerization of propylene in the presence of ethylene added at the start or in the course of the polymerization of propylene.

The support on which the modified polyolefin is applied may be made of metals, such as aluminum or iron, glass surfaces (for instance sheets), asbestos, cement, or of a polar polymer, such as polyamides, polyesters, homopolymers of vinyl chloride or of alkyl acrylates, ethylene-vinylacetate copolymers also partially hydrolyzed, and still others.

The polyolefins modified according to the present invention can be used not only as coatings for the above indicated materials, but also as agents rendering the material to be coated compatible with a non-modified polyolefin.

The modified polyolefin is applied onto the support by any one of the known coating methods. In general, the support is heated above the melting temperature of the modified polyolefin so that this latter, when applied, will melt and form a smooth layer. If, for instance, the material to be coated is a metal, the molten polyolefin will be applied onto a metal sheet by an extrusion process; or the metal sheet heated above the melting point of the polyolefin is coated, either by dipping into a fluid bed or by spraying, with the powdery polyolefin which will melt and adhere to the support, thus forming a smooth coating; or again the powdery polyolefin is made to adhere to the metal by means of an electrostatic process, whereafter the whole is heated above the melting point of the polyolefin.

If the material to be coated is a thermoplastic polymer, for instance a polyamide, both the thermoplastic polymer and the polyolefin may be made to melt and then subjected to a coextrusion process providing a stratified article made up of the two polymers.

By coextrusion it is also possible to obtain three-layered films.

The double-layer films, modified polyolefin-polar polymer, and the three-layered films, polyolefin/modified polyolefin/polar polymer, have the characteristics of low chemical reactivity typical of polyolefins, and the characteristics of mechanical resistance and/or impermeability to gases typical of the polar polymer.

The main applications of the process according to the invention concern the coating of pipes or other manufactured metal articles as a protection against atmospheric and chemical agents, and the lining of glass bottles in order to avoid explosive breakages and/or attacks by chemical washing agents.

The following examples are given to better elucidate the invention and are not to be taken as in anyway limiting the scope of same. In each example there is given the resistance to "peeling", that is the resistance to the tearing off of the polyolefinic coating from the support. The resistance to peeling, measured in a special Instron apparatus and expressed in kg/cm, is the force per unit of width of the joining line, required for progressively separating the coating from the support according to an angle of 180° and at a separation rate of 10 cm/min. (ASTM D 903 standards).

EXAMPLE 1

To 100 parts of a high density polyethylene powder, having a density of 0.962 g/cm$^3$ and a melt index E of 5.5 g/10 min. (ASTM D 1238 standards), there was added 0.5 part of N,N'-isophoron-bis-maleamic acid and the whole was mixed for 5 minutes in a powder mixer.

The "dry blend" thus obtained was extruded at 210° C. in the form of a film which was then pressed for 5 minutes at 220° C. onto sheets, previously degreased, respectively of aluminum, steel and Nylon 6; the sheets were then made to cool down at a rate of about 100° C. per minute, thereby obtaining laminates in which the thickness of polyethylene was 1.7 mm and that of the metal or Nylon 6 was 0.1 mm.

From each one of the three laminates there was obtained a strip 20 mm wide in which the polyolefin layer was partially peeled off from the supporting surface and the peeling resistance was measured with an Instron apparatus.

The obtained values were the following:
Composite with aluminum sheet: 7 kg/cm
Composite with steel sheet: 10 kg/cm
Composite with Nylon 6 sheet: 0.8 kg/cm

EXAMPLE 2

Example 1 was repeated with the only difference that to 100 parts of polyethylene there was added 1 part of N,N'-isophoron-bis-maleamic acid.

The peeling resistance values for the three laminates were the following:

Composite with aluminum sheet: 8 kg/cm
Composite with steel sheet: 10 kg/cm
Composite with Nylon 6 sheet: 1 kg/cm

EXAMPLE 3

In this example there was prepared a composite bottle from polyethylene and Nylon 6.

High density granular polyethylene, modified as indicated in example 1, was melted at 230° C. in an extruder feeding a co-extrusion head maintained at 240° C.

In a second extruder, adjacent to the former, Nylon 6 was melted at 260° C. and fed to the same coextrusion head and then to a mold.

In this way there was obtained a 500 cc composite bottle made of two layers: an outer layer of polyethylene 1 mm thick, and an inner layer of Nylon 6 0.1 mm thick.

A bottle of this type shows an excellent impermeability to gases, in particular to oxygen, and is suited for the preservation of foodstuffs and pharmaceutical products.

In order to determine the peeling resistance, from the lateral wall of the bottle there was cut off a 20 mm wide strip in which the Nylon layer was partially peeled off from the polyethylene layer, using the Instron apparatus of example 1: the resistance to peeling proved to be 0.7 kg/cm.

EXAMPLE 4

It was operated as in example 1, with the only difference that there was used a low density polyethylene having a density of 0.920 g/cm$^3$ and a melt index E of 0.7 g/10 min.

In the three laminates which were obtained the thickness of polyethylene was 1.7 mm and that of the metal or of Nylon 0.1 mm.

Proceeding as in example 1, the following values for the peeling resistance were obtained:
Composite with aluminum sheet: 5 kg/cm
Composite with steel sheet: 10 kg/cm
Composite with Nylon 6 sheet: ¢1 kg/cm
(the Nylon sheet breaks).

EXAMPLE 5

A low density polyethylene, having a density of 0.917 g/cm$^3$ and a melt index E of 7 g/10 min., modified with 0.5% of N,N'-isophoron-bis-maleamic acid, was subjected to grinding to obtain a powder with a granulometry comprised between 37 and 177 micron and a bulk density of 0.37 g/cm$^3$.

Such a modified polyolefin was used as an agent rendering iron pipes compatible with the same non-modified low density polyethylene pigmented with Fertene Black ZK 5 1830N.

The outer surface of the pipes was subjected to sanding and the pipes were then conveyed by a conveyor belt to a heating tunnel bringing them to a temperature of 220° C. at the outlet.

In a continuous feed, the pipes then entered another smaller tunnel in which the modified polyethylene in powder form, drawn from a fluid bed, was sprayed in such a way as to deposit on the pipes a layer of modified polyethylene having a thickness of about 0.1 mm.

The pipes were then passed through a lamination head kept under low pressure and fed by an extruder containing the pigmented polyethylene at about 180° C. The extrusion speed was such as to coat the iron pipes with a pigmented polyethylene layer 2 mm thick. The tubes were then passed through a water-cooled tunnel to bring them down to room temperature.

From the manufactured article thus obtained there was cut off in the direction of the axis of the pipe, a 20 mm wide strip in which the polyolefins composite layer was partially peeled off from the iron to measure the resistance to peeling: this latter amounted to 7 kg/cm.

EXAMPLE 6

A thermoplastic ethylene-propylene copolymer (ethylene content 5.3% by weight, amorphous fraction 8%, density 0.90 g/cm$^3$, melt index L 4.5 g/10 min.), modified with 0.5% of N,N'-isophoron-bis-maleamic acid, was melted and made to adhere under pressure at 220° C. to an aluminum sheet and a steel sheet, both degreased. After 5 minutes the composites thus obtained were cooled down at a rate of about 100° C./minute: the thickness of the copolymer coating was 1.7 mm and that of the metal support 0.1 mm.

From the two composites were cut off 20 mm wide strips which were then subjected to a partial peeling to evaluate the peeling resistance. For the latter the following values were obtained:
Composite with aluminum sheet: 5.5 kg/cm
Composite with steel sheet: 9 kg/cm Repeating the test with the same ethylene-propylene copolymer modified with 1% of N,N'-isophoron-bis-maleamic acid, the above values rose respectively to 6 and 10 kg/cm.

EXAMPLE 7

A polypropylene with a density of 0.90 g/cm$^3$ and a melt index L of 10 g/10 min., modified with 0.5% of N,N'-isophoron-bis-maleamic acid, was melted and made to adhere under pressure onto two degreased sheets, one of aluminum and the other of steel.

Operating as in example 6, there were obtained the following values of the peeling resistance:
Composite with aluminum sheet: 4 kg/cm
Composite with steel sheet: 8 kg/cm Repeating the test with the same polypropylene, modified with 1% of N,N'-isophoron-bis-maleamic acid, the above values rose respectively to 5 and 9 kg/cm.

EXAMPLE 8

90 parts of a polypropylene with a density of 0.90 g/cm$^3$ and a melt index L of 5 g/10 min., were mixed in the molten state with 10 parts of a low density polyethylene having a melt index E of 0.7 g/10 min., previously modified with 5% of N,N'-isophoron-bis-maleamic acid.

The resulting product was made to adhere, in the molten state and under pressure, onto an aluminum sheet and a steel sheet, both degreased.

Operating as in example 6, there were obtained the following values of the peeling resistance:
Composite with aluminum sheet: 3.5 kg/cm
Composite with steel sheet: 7.5 kg/cm

EXAMPLE 9

95 parts of a polypropylene with a density of 0.90 g/cm$^3$ and a melt index L of 10 g/10 min., modified with 0.5% of N,N'-isophoron-bis-maleamic acid, were mixed with 5 parts of an elastomeric ethylene-propylene copolymer ("Dutral CO-054", produced and marketed by MONTEDISON S.p.A.).

The resulting mixture was made to adhere, in the molten state and under pressure, onto an aluminum sheet and a steel sheet, both degreased.

Operating according to example 6, the following values of the peeling resistance were found:
Composite with aluminum sheet: 5 kg/cm
Composite with steel sheet: 9 kg/cm Repeating the test with the same polypropylene modified with 1% of N,N'-isophoron-bis-maleamic acid, the resistance to peeling of the two composites rose, respectively, to 6 and 10 kg/cm.

EXAMPLE 10

100 parts of a polypropylene with a density of 0.90 g/cm$^3$ and a melt index L of 10 g/10 min. were added with 0.3 parts of powdery isophoron-diamine and the whole was mixed in a powder mixer for 1 minute. Thereafter, 0.3 parts of maleic anhydride were added and the mixing was continued for a further minute.

The so obtained dry blend was extruded at 210° C., cooled down and granulated.

The granular product was heated at 220° C. for 5 minutes, pressed at the same temperature on previously degreased aluminum sheets and then made to cool at a rate of about 100° C./min.

The resulting composite showed a peeling resistance of 7 kg/cm.

EXAMPLE 11

Following the same procedure as in example 10, 100 parts of polypropylene were added with 0.3 parts of hexamethylene diisocyanate and 0.4 parts of fumaric acid. A modified polymer was obtained showing, on aluminum sheets, a peeling resistance of 4 kg/cm.

EXAMPLE 12

Following the same procedure as in example 10, 100 parts of polypropylene were added with 0.3 parts of hexamethylene diisocyanate and 0.4 parts of maleic acid. A modified polymer was obtained showing, on aluminum sheets, a peeling resistance of 4 kg/cm.

EXAMPLE 13

Following the same procedure as in example 10, 100 parts of polypropylene were added with 0.25 parts hexamethylene diisocyanate, 0.16 parts of maleic acid and 0.23 parts of monoethyl maleate. A modified polymer was obtained showing, on aluminum sheets, a peeling resistance of 9 kg/cm.

EXAMPLE 14

This example is concerned with the manufacture of a sandwich structure of the type metal/polyolefin/metal.

Polypropylene modified as indicated in example 7 was heated at 230° C. for 5 minutes between two steel sheets 0.2 mm thick and then pressed at the same temperature for further 3 minutes, thus reducing the total thickness of the sandwich to 1 mm. At the end the structure was made to cool down to room temperature at a rate of about 100° C./min.

The three-layered laminate thus obtained showed a peeling resistance of 6 kg/cm and an elastic modulus (ASTM D 790 standards) of 14,000 kg/mm$^2$.

What is claimed is:

1. Process for promoting the adhesion between polyolefins and metals, glass sheets, cement, asbestos or polar polymers, characterized in that the polyolefin is modified by reaction with 0.01-7% by weight of a modifying agent selected from the group consisting of (1) bismaleamic acids of general formula

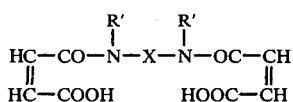

wherein X is a group (CHR)$_n$, in which n is an integer from 2 to 18 and R is hydrogen or an alkyl having from 1 to 6 carbon atoms, or X is a bivalent cycloaliphatic or aromatic group, containing one, or more than one, ring or a heterocyclic group; R' is hydrogen, or the two R' together form a (CHR)$_n$ group when X is (CHR)$_n$, (2) the corresponding stereoisomer bisfumaramic acids, (3) alkyl esters of said acids in which the alkyl radical has from 1 to 12 carbon atoms, and (4) the reaction product of a mixture of precursors of said acids or esters; and subsequently heated at the temperature at which the polyolefin is applied onto the material to be adhered thereto.

2. Process according to claim 1, in which the modifying agent is N,N'-isophoron-bis-maleamic acid.

3. Process according to claim 1, in which the modifying agent is the reaction product of a mixture of isophoron-diamine and maleic anhydride.

4. Process according to claim 1, in which the modifying agent is the reaction product of a mixture of hexamethylene diisocyanate and fumaric acid.

5. Process according to claim 1, in which the modifying agent is the reaction product of a mixture of hexamethylene diamine and maleic acid.

6. Process according to claim 1, in which the modifying agent is the reaction product of a mixture of hexamethylene diamine, maleic acid and monoethyl maleate.

7. Process according to claim 1, in which the polyolefin is polyethylene.

8. Process according to claim 1, in which the polyolefin is polypropylene.

9. Process according to claim 1, in which the polyolefin is a thermoplastic ethylene-propylene copolymer.

10. Process according to claim 1, in which the modified polyolefin is subsequently heated at the temperature at which it is adhered to a polyamide.

11. Process according to claim 1, in which the modified polyolefin is subsequently heated at the temperature at which it is adhered to a metal selected from iron and aluminum.

12. Polyolefins suitable for the adhesion to metals, glass sheets, cement, asbestos or polar polymers, modified by reaction with a modifying agent selected from the group consisting of (1) bis-maleamic acids of general formula

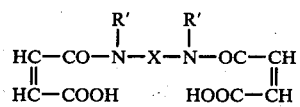

wherein X is a group (CHR)$_n$, in which n is an integer from 2 to 18 and R is hydrogen or an alkyl having from 1 to 6 carbon atoms, or X is a bivalent cycloaliphatic or aromatic group, containing one, or more than one, ring or a heterocyclic group; R' is hydrogen, or the two R' together being also capable of forming a (CHR)$_n$ group when X is (CHR)$_n$, (2) the corresponding stereoisomer bisfumaric acids, (3) alkyl esters of said acids in which the alkyl radical has from 1 to 12 carbon atoms, and (4) the reaction product of a mixture of precursors of said acids or esters; said modifying agent being added and reacted with the polyolefin in an amount ranging from 0.01 to 7% by weight.

13. Crystalline polypropylene modified by reaction with 0.01–7% by weight of a modifying agent as defined in claim 12.

* * * * *